US011375199B2

(12) United States Patent
Sychev et al.

(10) Patent No.: US 11,375,199 B2
(45) Date of Patent: *Jun. 28, 2022

(54) INTERPOLATION FILTER FOR AN INTER PREDICTION APPARATUS AND METHOD FOR VIDEO CODING (71) Applicant: Huawei Technologies Co., Ltd., Shenzhen (CN)

(72) Inventors: Maxim Borisovitch Sychev, Moscow (RU); Georgy Aleksandrovich Zhulikov, Moscow (RU); Timofey Mikhailovich Solovyev, Moscow (RU); Jianle Chen, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,854

(22) Filed: Apr. 16, 2020

(65) Prior Publication Data

US 2020/0244965 A1 Jul. 30, 2020

Related U.S. Application Data (63) Continuation of application No. PCT/RU2018/000136, filed on Mar. 6, 2018.

(30) Foreign Application Priority Data

Nov. 7, 2017 (RU) .................. PCT/RU2017/000830

(51) Int. Cl.
H04N 7/18 (2006.01)
H04N 19/132 (2014.01)
(Continued)

(52) U.S. Cl.
CPC ......... *H04N 19/132* (2014.11); *H04N 19/105* (2014.11); *H04N 19/117* (2014.11);
(Continued)

(58) Field of Classification Search
CPC .... H04N 19/132; H04N 19/182; H04N 19/52; H04N 19/593; H04N 19/105;
(Continued)

(56) References Cited

U.S. PATENT DOCUMENTS 6,275,532 B1  8/2001  Hibi et al.
7,782,951 B2  8/2010  Muthukrishnan et al.
(Continued)

FOREIGN PATENT DOCUMENTS

CN  101999230 A  3/2011
CN  102638678 A  8/2012
(Continued)

OTHER PUBLICATIONS

Matsuo et al, Improved intra angular prediction by DCT-based interpolation filter (Year: 2012).*
(Continued)

*Primary Examiner* — Shan E Elahi
(74) *Attorney, Agent, or Firm* — Leydig, Voit & Mayer, Ltd.

(57) ABSTRACT

The disclosure relates to an apparatus and method for inter prediction of a sample value of a current full-integer pixel of a plurality of pixels of a current block of a current frame of a video signal. The apparatus comprises a processing unit configured to: determine a motion vector of the current full-integer pixel on the basis of the current frame and a reference frame of the video signal and/or on the basis of a motion compensation model; determine for the current full-integer pixel a corresponding sub-integer pixel in the reference frame on the basis of the motion vector of the current
(Continued)

full-integer pixel; generate on the basis of a predefined set of filter support pixels in the current frame a set of corresponding filter support pixels in the reference frame, wherein the predefined set of filter support pixels in the current frame comprises one or more neighboring full-integer and/or sub-integer pixels of the current full-integer pixel; determine a respective sample value of the corresponding sub-integer pixel of the current full-integer pixel and the corresponding filter support pixels in the reference frame; and determine the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

16 Claims, 7 Drawing Sheets

(51) Int. Cl.
| | |
|---|---|
| H04N 19/105 | (2014.01) |
| H04N 19/117 | (2014.01) |
| H04N 19/137 | (2014.01) |
| H04N 19/159 | (2014.01) |
| H04N 19/176 | (2014.01) |
| H04N 19/182 | (2014.01) |
| H04N 19/52 | (2014.01) |
| H04N 19/593 | (2014.01) |

(52) U.S. Cl.
CPC ......... *H04N 19/137* (2014.11); *H04N 19/159* (2014.11); *H04N 19/176* (2014.11); *H04N 19/182* (2014.11); *H04N 19/52* (2014.11); *H04N 19/593* (2014.11)

(58) Field of Classification Search
CPC .. H04N 19/117; H04N 19/137; H04N 19/159; H04N 19/176; H04N 19/80; H04N 19/537; H04N 19/59; H04N 19/103; H04N 19/523
USPC ...................................................... 375/240.02
See application file for complete search history.

(56) References Cited

U.S. PATENT DOCUMENTS

| | | | |
|---|---|---|---|
| 7,792,192 B2 | 9/2010 | Nagarajan | |
| 8,693,534 B1 | 4/2014 | Lewis et al. | |
| 8,705,622 B2 | 4/2014 | Ye et al. | |
| 8,750,378 B2* | 6/2014 | Karczewicz | H04N 19/176 375/240.12 |
| 10,045,046 B2* | 8/2018 | Panchal | H04N 19/523 |
| 10,506,252 B2 | 12/2019 | Rusanovskyy et al. | |
| 2003/0179827 A1* | 9/2003 | Sugiyama | H04N 19/85 375/240.29 |
| 2003/0222998 A1* | 12/2003 | Yamauchi | G06T 5/20 348/262 |
| 2006/0294171 A1 | 12/2006 | Bossen et al. | |
| 2008/0037647 A1* | 2/2008 | Stojancic | H04N 19/523 375/E7.101 |
| 2009/0257493 A1* | 10/2009 | Ye | H04N 19/523 375/E7.243 |
| 2009/0257494 A1* | 10/2009 | Ye | H04N 19/136 375/E7.243 |
| 2009/0257499 A1* | 10/2009 | Karczewicz | H04N 19/82 375/E7.123 |
| 2009/0257501 A1* | 10/2009 | Ye | H04N 19/82 375/E7.243 |
| 2009/0257502 A1* | 10/2009 | Ye | H04N 19/147 375/E7.221 |
| 2009/0257503 A1* | 10/2009 | Ye | H04N 19/136 375/E7.123 |
| 2009/0257668 A1* | 10/2009 | Ye | H04N 19/50 382/233 |
| 2010/0074332 A1* | 3/2010 | Karczewicz | H04N 19/176 375/E7.243 |
| 2011/0243471 A1 | 10/2011 | Alshina et al. | |
| 2011/0274158 A1 | 11/2011 | Fu et al. | |
| 2012/0134425 A1* | 5/2012 | Kossentini | H04N 19/463 375/E7.027 |
| 2012/0147967 A1* | 6/2012 | Panchal | H04N 19/523 375/E7.125 |
| 2012/0170650 A1* | 7/2012 | Chong | H04N 19/117 375/E7.243 |
| 2012/0177104 A1 | 7/2012 | Budagavi et al. | |
| 2012/0288213 A1 | 11/2012 | Amon et al. | |
| 2013/0003871 A1 | 1/2013 | Bjontegaard et al. | |
| 2013/0010865 A1* | 1/2013 | Coban | H04N 19/43 375/E7.243 |
| 2013/0094569 A1 | 4/2013 | Chong et al. | |
| 2013/0182780 A1* | 7/2013 | Alshin | H04N 19/59 382/264 |
| 2013/0243091 A1* | 9/2013 | Ye | H04N 19/80 375/240.16 |
| 2014/0133551 A1* | 5/2014 | Alshina | G06T 3/4007 375/240.03 |
| 2015/0178891 A1 | 6/2015 | Alshina et al. | |
| 2015/0189317 A1* | 7/2015 | Alshina | H04N 19/82 375/240.16 |
| 2015/0201204 A1* | 7/2015 | Chen | H04N 19/30 375/240.02 |
| 2015/0271503 A1* | 9/2015 | Jeon | H04N 19/117 382/238 |
| 2015/0382005 A1 | 12/2015 | Budagavi | |
| 2017/0237981 A1 | 8/2017 | Karczewicz et al. | |
| 2018/0091825 A1* | 3/2018 | Zhao | H04N 19/159 |
| 2018/0139468 A1 | 5/2018 | Lin et al. | |
| 2018/0213251 A1* | 7/2018 | Ikonin | H04N 19/82 |
| 2018/0365801 A1 | 12/2018 | Diasparra | |
| 2020/0244965 A1 | 7/2020 | Sychev et al. | |

FOREIGN PATENT DOCUMENTS

| | | |
|---|---|---|
| CN | 105704492 A | 6/2016 |
| EP | 1841230 A1 | 10/2007 |
| EP | 3203740 A1 | 8/2017 |
| JP | 2010093377 A | 4/2010 |
| JP | 2014502800 A | 2/2014 |
| KR | 20200057088 A | 5/2020 |
| RU | 2612611 C2 | 3/2017 |
| WO | 2013155084 A1 | 10/2013 |
| WO | 2016065873 A1 | 5/2016 |
| WO | 2016076680 A1 | 5/2016 |
| WO | 2017005128 A1 | 1/2017 |
| WO | 2017052405 A1 | 3/2017 |
| WO | 2017052408 A1 | 3/2017 |
| WO | 2017052409 A1 | 3/2017 |
| WO | 2017086823 A1 | 5/2017 |
| WO | 2017093253 A1 | 6/2017 |
| WO | 2017123487 A1 | 7/2017 |

OTHER PUBLICATIONS

Cho et al, Block-Adaptive Interpolation Filter using dictionary for Sub-Pixel Motion Compensation (Year: 2012).*

Rossholm et al., "Low-Complex Adaptive Post Filter for Enhancement of Coded Video," 2007 9th International Symposium on Signal Processing and Its Applications, XP031280715, pp. 1-4, Institute of Electrical and Electronics Engineers, New York, New York (Feb. 2007).

Fu, "Understanding the DaVinci Resizer," Application Report, SPRAAI7B, Retrieved from the Internet: URL:http://www.ti.com/lit/an/spraai7b/spraai7b.pdf, XP055488351, pp. 1-30, Texas Instruments, Dallas, Texas (Jul. 2008).

(56) References Cited

OTHER PUBLICATIONS

Narroschke et al., "Extending HEVC by an affine motion model," 2013 Picture Coding Symposium (PCS), pp. 321-324, XP032566989, Institute of Electrical and Electronics Engineers, New York, New York (Dec. 2013).

Heithausen, "Inter Prediction using Estimation and Explicit Coding of Affine Parameters," Joint Video Exploration Team (JVET) of ITU-T SG 16 WP 3 and ISO/IEC JTC 1/SC 29/WG 11, 8th Meeting Macao, CN, Document No. JVET-H0031, XP030151014, pp. 1-10 (Oct. 18-24, 2017).

Huang et al., "Control-Point Representation and Differential Coding Affine-Motion Compensation," IEEE Transactions on Circuits and Systems for Video Technology, vol. 23, No. 10, XP011528531, pp. 1651-1660, Institute of Electrical and Electronics Engineers, New York, New York (Oct. 2013).

Sychev et al., "Sharpening Filter for Interlayer Prediction," 2014 IEEE Visual Communications and Image Processing Conference, XP032741195, pp. 470-473, Institute of Electrical and Electronics Engineers, New York, New York (Dec. 2014).

Jin et al., "Motion Estimation and Compensation for Fisheye Warped Video," 2015 IEEE International Conference on Image Processing (ICIP), XP032826972, pp. 2751-2755, Institute of Electrical and Electronics Engineers, New York, New York (Sep. 2015).

"Information technology—High efficiency coding and media delivery in heterogeneous environments—Part 2: High efficiency video coding," ISO/IEC 23008-2, total 13 pages (Dec. 2013).

Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronics Engineers, New York, New York (Dec. 2012).

Ugur et al., "Motion Compensated Prediction and Interpolation Filter Design in H.265/HEVC," IEEE Journal of Selected Topics in Signal Processing vol. 7, No. 6, pp. 946-956, Institute of Electrical and Electronics Engineers, New York, New York (Dec. 2013).

LV et al., "A Comparison of Fractional-Pel Interpolation Filters in HEVC and H.264/AVC," Visual Communications and Image Processing, total 6 pages (2012).

"Series H: Audiovisual and Multimedia Systems, Infrastructure of audiovisual services—Coding of moving video, Advanced video coding for generic audiovisual services," Recommendation of ITU-T H.264, ITU-T Telecommunication Standardization Sector of ITU, pp. 1-812, International Telecommunication Union, Geneva, Switzerland (Apr. 2017).

"Series H: Audiovisual and Multimedia Systems Infrastructure of audiovisual services—Coding of moving video, High efficiency video coding," Recommendation of ITU-T H.265, ITU-T Telecommunication Standardization Sector of ITU, H.265, pp. 1-664, International Telecommunication Union, Geneva, Switzerland (Dec. 2016).

Block Adaptive Interpolation Filter using Trained Dictionary Sub-pixel motion compensation; 2011; (Year: 2011).

Akula et al., "Description of SDR, HDR and 360° video coding technology proposal considering mobile application scenario by Samsung, Huawei, GoPro, and HiSilicon," buJoint Video Exploration Team (JVET) of ITU-T SG 16 WP 3 and ISO/IEC JTC 1/SC 29/WG 11, 10th Meeting: San Diego, US, JVET-J0024_v2, total 7 pages (Apr. 10-20, 2018).

Chen et al., "Description of SDR, HDR and 360° video coding technology proposal by Huawei, GoPro, HiSilicon, and Samsung," buJoint Video Exploration Team (JVET) of ITU-T SG 16 WP 3 and ISO/IEC JTC 1/SC 29/WG 11, 10th Meeting: San Diego, US, Document: JVET-J0025_v2, total 7 pages (Apr. 10-20, 2018).

Sychev et al., "CE4-related: On performance improvements of Enhanced Interpolation Filter (EIF)," Joint Video Experts Team (JVET) of ITU-T SG 16 WP 3 and ISO/IEC JTC 1/SC 29/WG 11, 11th Meeting: Ljubljana, SI, Document JVET-K0193-V4, total 12 pages (Jul. 10-18, 2018).

Block-Adaptive Interpolation Filter for Sub-pixel motion compensation; 2012 (Year: 2012).

Block Adaptive Interpolation Filter using Trained Dictionary for Sub-pixel motion compensation; 2011 (Year: 2011).

\* cited by examiner

Fig.7(Tbl. 1)

INTERPOLATION FILTER FOR AN INTER PREDICTION APPARATUS AND METHOD FOR VIDEO CODING

CROSS-REFERENCE TO RELATED APPLICATIONS

This application is a continuation of International Application No. PCT/RU2018/000136, filed on Mar. 6, 2018, which claims priority to International Application No. PCT/RU2017/000830, filed Nov. 7, 2017. The aforementioned applications are hereby incorporated by reference in its entirety.

TECHNICAL FIELD

Generally, the present disclosure relates to the field of video coding. More specifically, the present disclosure relates to an interpolation filter for an inter prediction apparatus and method for video coding as well as an encoding apparatus and a decoding apparatus comprising such an inter prediction apparatus.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

The state-of-the-art video coding standards are based on partitioning of a source frame or picture into frame or picture blocks. Processing of these blocks depend on their size, spatial position and a coding mode specified by an encoder. Coding modes can be classified into two groups according to the type of prediction: intra- and inter-prediction modes. Intra-prediction modes use pixels of the same frame (also referred to as picture or image) to generate reference samples to calculate the prediction values for the pixels of the block being reconstructed. Intra-prediction is also referred to as spatial prediction. Inter-prediction modes are designed for temporal prediction and uses reference samples of previous or next frames to predict pixels of the block of the current frame. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2:2013, "Information technology-High efficiency coding and media delivery in heterogeneous environments—Part 2: High efficiency video coding", December 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source frame into frame blocks in the form of so-called coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as Deblocking Filter (DBF), Sample Adaptive Offset (SAO) and Adaptive Loop Filter (ALF) try to suppress.

Sub-integer pixel interpolation techniques have been developed in order to improve the prediction accuracy for a level of compression that can be achieved for inter prediction. In this case, the predictive data generated during motion compensation, which is used to code a video block, may correspond to sub-integer pixels, whose values may be interpolated from values for full pixels of video blocks of a reference video frame or other coded unit to which a motion vector refers. The video encoder may calculate values for sub-integer pixel positions using interpolation techniques, e.g., by applying interpolation filters to a set of support pixels, e.g., values for full integer pixels and/or previously coded values of other sub-integer pixel positions.

Today's standards H.264/AVC and H.265/HEVC are based on a ¼ pel displacement resolution. The Joint Video Exploration Team (JVET) group is exploring post-HEVC video compression technologies, including non-translational motion compensation models, such as affine transforms. In order to estimate and compensate the fractional-pel (or sub-integer) displacements, the full-integer pixels of the reference image has to be interpolated on the fractional-pel, i.e. sub-integer positions. To get the interpolated image on the fractional-pel positions interpolation filters are used. The problem of interpolation for non-translation motion models is the variable fractional-pel displacements.

The quality of the interpolated image strongly depends on the properties of the interpolation filter(s). Short-tap filters (e.g. bilinear) may suppress high frequencies and make interpolated picture blurred. On the other hand, long-tap filters (e.g. sinc-based) require more memory bandwidth and may preserve high frequencies but generate some ringing artifacts in the vicinity of sharp edges. Another consideration is that for motion compensation of non-translational models the complexity has been reduced by decreasing of accuracy of interpolation and prediction.

In the proposed JEM affine motion model there are two types of motion supported: zoom and rotation. Most of the fractional-pel positions are non-constant within a prediction unit. Pixels are replaced by sub-blocks to speed up the interpolation. Within one sub-block the displacement vector is constant and translational. The complexity was reduced gradually but accuracy was reduced as well. To improve the quality of prediction the precision of motion compensation was improved by increasing the precision of motion vector displacement for sub-blocks with increasing of amount of interpolation filters. Current accuracy of interpolation filtering for non-translational motion model still requires to be improved.

Thus, there is a need for an improved interpolation filter for an inter prediction apparatus and method for video coding providing an improved video coding efficiency.

SUMMARY

It is an object of the disclosure to provide an improved interpolation filter for an inter prediction apparatus and method for video coding providing an improved video coding efficiency.

The foregoing and other objects are achieved by the subject matter of the independent claims. Further implementation forms are apparent from the dependent claims, the description and the figures.

According to a first aspect the disclosure relates to an apparatus for inter prediction of a sample value of a current full-integer pixel of a plurality of pixels of a current block of a current frame of a video signal. The apparatus comprises a processing unit configured to: determine a motion vector of the current full-integer pixel on the basis of the current frame and a reference frame of the video signal and/or a motion compensation model; determine for the current full-integer pixel a corresponding sub-integer pixel in the reference frame on the basis of the motion vector of the current full-integer pixel; generate on the basis of a predefined set of filter support pixels in the current frame a set of corresponding filter support pixels in the reference frame, wherein the predefined set of filter support pixels in the current frame comprises one or more neighboring full-integer pixels and/or sub-integer pixels of the current full-integer pixel; determine a respective sample value, in particular luminance value, of the corresponding sub-integer pixel of the current full-integer pixel and the corresponding filter support pixels in the reference frame; and determine the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

Thus, an improved inter prediction apparatus is provided allowing improving the efficiency for video coding.

In a further possible implementation form of the first aspect, the predefined set of filter support pixels in the current frame comprises one or more vertically and/or horizontally neighboring half-integer pixels of the current full-integer pixel in the current frame.

In a further possible implementation form of the first aspect, the predefined set of filter support pixels in the current frame comprises one or more vertically and/or horizontally neighboring full-integer pixels of the current full-integer pixel in the current frame.

In a further possible implementation form of the first aspect, the spatial high-pass filter is a 5-tap filter or a 3-tap filer. In an implementation form, the 5-tap filter or the 3-tap filter is a symmetric filter, i.e. a filter where the first and the fifth filter coefficients (or, in the case of the 3-tap filter, the first and the third filter coefficients) are identical and the second and the fourth filter coefficients are identical. In an implementation form, the first and the fifth filter coefficients are negative, while the other filter coefficients of the 5-tap filter are positive.

In a further possible implementation form of the first aspect, the predefined set of filter support pixels in the current frame comprises one or more neighboring full-integer pixels and half-integer pixels of the current full-integer pixel and the 5-tap filter has the following filter coefficients (−6, 9, 26, 9, −6), which can be normalized by the factor 1/32.

In a further possible implementation form of the first aspect, the predefined set of filter support pixels in the current frame comprises one or more neighboring full-integer pixels and half-integer pixels of the current full-integer pixel and the 5-tap filter has the following filter coefficients (−1, 0, 10, 0, −1), which can be normalized by the factor 1/8. As will be appreciated, in a further possible implementation form without the intermediate half-integer support pixels, this filter becomes a 3-tap filter with the coefficients (−1, 10, −1).

In a further possible implementation form of the first aspect, the processing unit of the apparatus is configured to determine the respective sample values of the corresponding sub-integer pixel of the current full-integer pixel in the reference frame and of the corresponding filter support pixels in the reference frame on the basis of a bilinear interpolation of the respective neighboring full-integer pixels in the reference frame.

In a further possible implementation form of the first aspect, the processing unit of the apparatus is further configured to determine a respective motion vector of each of the sub-integer pixels of the filter support pixels in the current frame on the basis of the motion vector of the current full-integer pixel and one or more motion vectors of neighboring full-integer pixels of the current full-integer pixel.

In a further possible implementation form of the first aspect, the processing unit of the apparatus is configured to determine a respective motion vector of each of the sub-integer pixels of the filter support pixels in the current frame by determining a mean vector of the motion vector of the current full-integer pixel and one or more motion vectors of neighboring full-integer pixels of the current full-integer pixel.

In a further possible implementation form of the first aspect, the processing unit of the apparatus is further configured to determine the one or more motion vectors of neighboring full-integer pixels of the current full-integer pixel on the basis of the current frame and the reference frame of the video signal and/or a motion compensation model.

In a further possible implementation form of the first aspect, the processing unit of the apparatus is configured to determine the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame, in case the motion vector of the current full-integer pixel is determined on the basis of a non-translational motion compensation model, and to determine the inter predicted sample value of the current pixel in the current frame on the basis of a conventional scheme, such as the conventional scheme defined in H.264/AVC and H.265/HEVC, in case the motion vector of the current full-integer pixel is determined on the basis of a translational motion compensation model.

In a further possible implementation form of the first aspect, the non-translational motion compensation model is an affine, warping and/or panoramic motion compensation model.

According to a second aspect the disclosure relates to a corresponding method for inter prediction of a sample value of a current full-integer pixel of a plurality of pixels of a current block of a current frame of a video signal. The method comprises the steps of: determining a motion vector of the current full-integer pixel on the basis of the current frame and a reference frame of the video signal and/or on the basis of a motion compensation model; determining for the current full-integer pixel a corresponding sub-integer pixel in the reference frame on the basis of the motion vector of the current full-integer pixel; generating on the basis of a predefined set of filter support pixels in the current frame a set of corresponding filter support pixels in the reference frame, wherein the predefined set of filter support pixels in the current frame comprises one or more neighboring full-integer pixels and/or sub-integer pixels of the current full-integer pixel; determining a respective sample value, in particular luminance value, of the corresponding sub-integer pixel of the current full-integer pixel and the corresponding filter support pixels in the reference frame; and determining the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

Thus, an improved inter prediction method is provided allowing improving the efficiency for video coding.

The inter prediction method according to the second aspect of the disclosure can be performed by the inter prediction apparatus according to the first aspect of the disclosure. Further features of the inter prediction method according to the second aspect of the disclosure result directly from the functionality of the inter prediction apparatus according to the first aspect of the disclosure and its different implementation forms described above and below.

According to a third aspect the disclosure relates to an encoding apparatus for encoding a current frame of a video signal, wherein the encoding apparatus comprises an inter prediction apparatus according to the first aspect.

According to a fourth aspect the disclosure relates to a decoding apparatus for decoding a current reconstructed frame of a compressed video signal, wherein the decoding apparatus comprises an inter prediction apparatus according to the first aspect.

According to a fifth aspect the disclosure relates to a computer program product comprising program code for performing the method according to the second aspect when executed on a computer or a processor.

Embodiments of the disclosure provide in particular for the following advantages. Embodiments of the disclosure allow performing interpolation with pixel-wise accuracy while keeping the complexity at a low level. Embodiments of the disclosure support any kind of non-translational movements. Embodiments of the disclosure allow removing blocking artifacts across sub-blocks edges. Embodiments of the disclosure reduce memory bandwidth. Embodiments of the disclosure reduce memory requirements for storing a set of filter coefficients. Embodiments of the disclosure allow reusing well optimized in HW bilinear transform. Embodiments of the disclosure align orientation of filtering along transformation. Embodiments of the disclosure allow reducing ringing artifacts caused by long motion interpolation filter while improving quality of interpolated edges. Embodiments of the disclosure allow increasing subjective quality of edges in reconstructed pictures. Moreover, embodiments of the disclosure do not require any additional signaling and, thus, can seamlessly replace existing interpolation methods for non-translational movements. Splitting the interpolation into two steps allows separating the fractional offset compensation from the high-pass filtering.

BRIEF DESCRIPTION OF THE DRAWINGS

Further embodiments of the disclosure will be described with respect to the following figures, wherein.

In the various figures, identical reference signs will be used for identical or functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
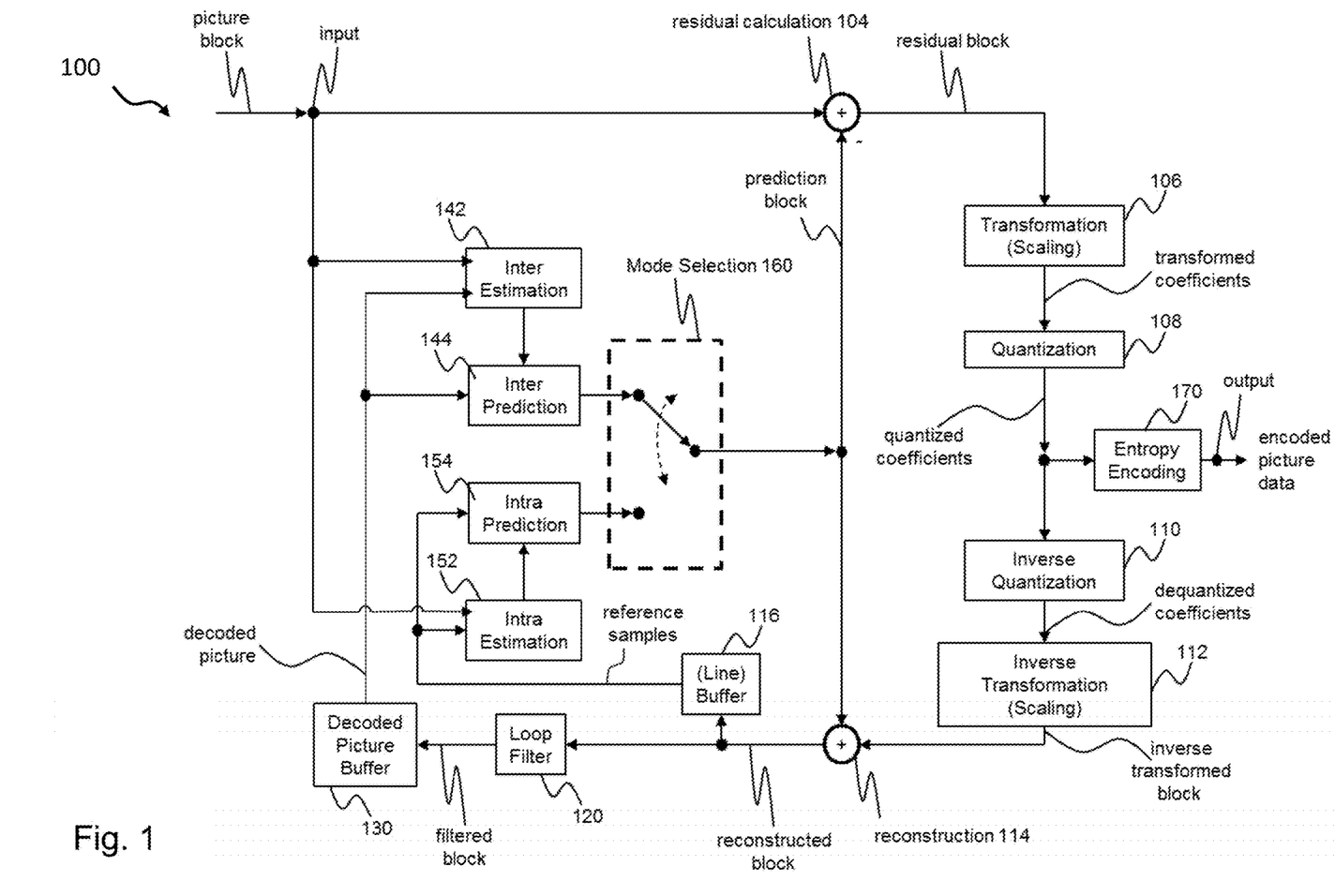
FIG. 1 shows a schematic diagram illustrating an encoding apparatus according to an embodiment comprising an inter prediction apparatus according to an embodiment.

FIG. 1 shows an encoding apparatus 100 according to an embodiment comprising an inter prediction apparatus 144 according to an embodiment. The encoding apparatus 100 is configured to encode a block of a frame of a video signal comprising a plurality of frames (also referred to as pictures or images herein), wherein each frame is dividable into a plurality of blocks and each block comprises a plurality of pixels. In an embodiment, the blocks could be macro blocks, coding tree units, coding units, prediction units and/or prediction blocks.

In the exemplary embodiment shown in FIG. 1, the encoding apparatus 100 is implemented in the form of a hybrid video coding encoder. Usually, the first frame of a video signal is an intra frame, which is encoded using only intra prediction. To this end, the embodiment of the encoding apparatus 100 shown in FIG. 2 further comprises an intra prediction unit 154 for intra prediction. An intra frame can be decoded without information from other frames. The intra prediction unit 154 can perform the intra prediction of a block on the basis of information provided by the intra estimation unit 152.

The blocks of subsequent frames following the first intra frame can be coded using inter or intra prediction, as selected by a mode selection unit 160. Generally, the inter prediction unit 144 can be configured to perform motion compensation of a block based on motion estimation, as will be described in more detail further below. In an embodiment, the motion estimation can be performed by an inter estimation unit 142 of the encoding apparatus. However, in other embodiments, the functionality of the inter estimation unit 142 can be implemented as part of the inter prediction unit 144 as well.

Furthermore, in the hybrid encoder embodiment shown in FIG. 1 a residual calculation unit 104 determines the difference between the original block and its prediction, i.e. the residual block defining the prediction error of the intra/inter picture prediction. This residual block is transformed by the transformation unit 106 (for instance using a DCT) and the transformation coefficients are quantized by the quantization unit 108. The output of the quantization unit 108 as well as the coding or side information provided, for instance, by the inter prediction unit 144 are further encoded by an entropy encoding unit 170.

A hybrid video encoder, such as the encoding apparatus 100 shown in FIG. 1, usually duplicates the decoder processing such that both will generate the same predictions. Thus, in the embodiment shown in FIG. 1 the inverse quantization unit 110 and the inverse transformation unit perform the inverse operations of the transformation unit 106 and the quantization unit 108 and duplicate the decoded approximation of the residual block. The decoded residual block data is then added to the results of the prediction, i.e. the prediction block, by the reconstruction unit 114. Then, the output of the reconstruction unit 114 can be provided to a line buffer 116 to be used for intra prediction and is further processed by an in-loop filter 120 for removing image artifacts. The final picture is stored in a decoded picture buffer 130 and can be used as a reference frame for the inter prediction of subsequent frames.

Figure 2:
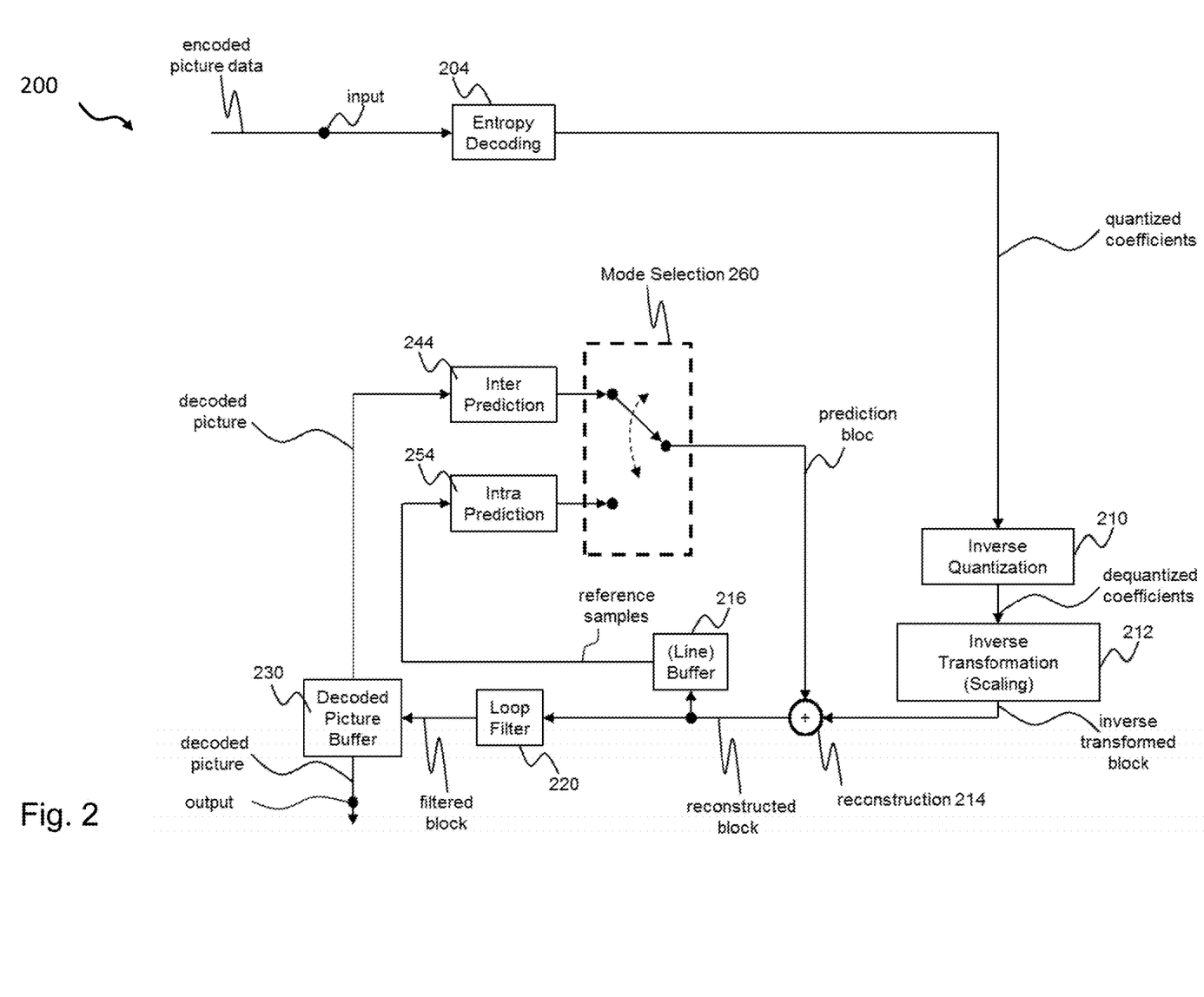
FIG. 2 shows a schematic diagram illustrating a decoding apparatus according to an embodiment comprising an inter prediction apparatus according to an embodiment.
Figure 3:
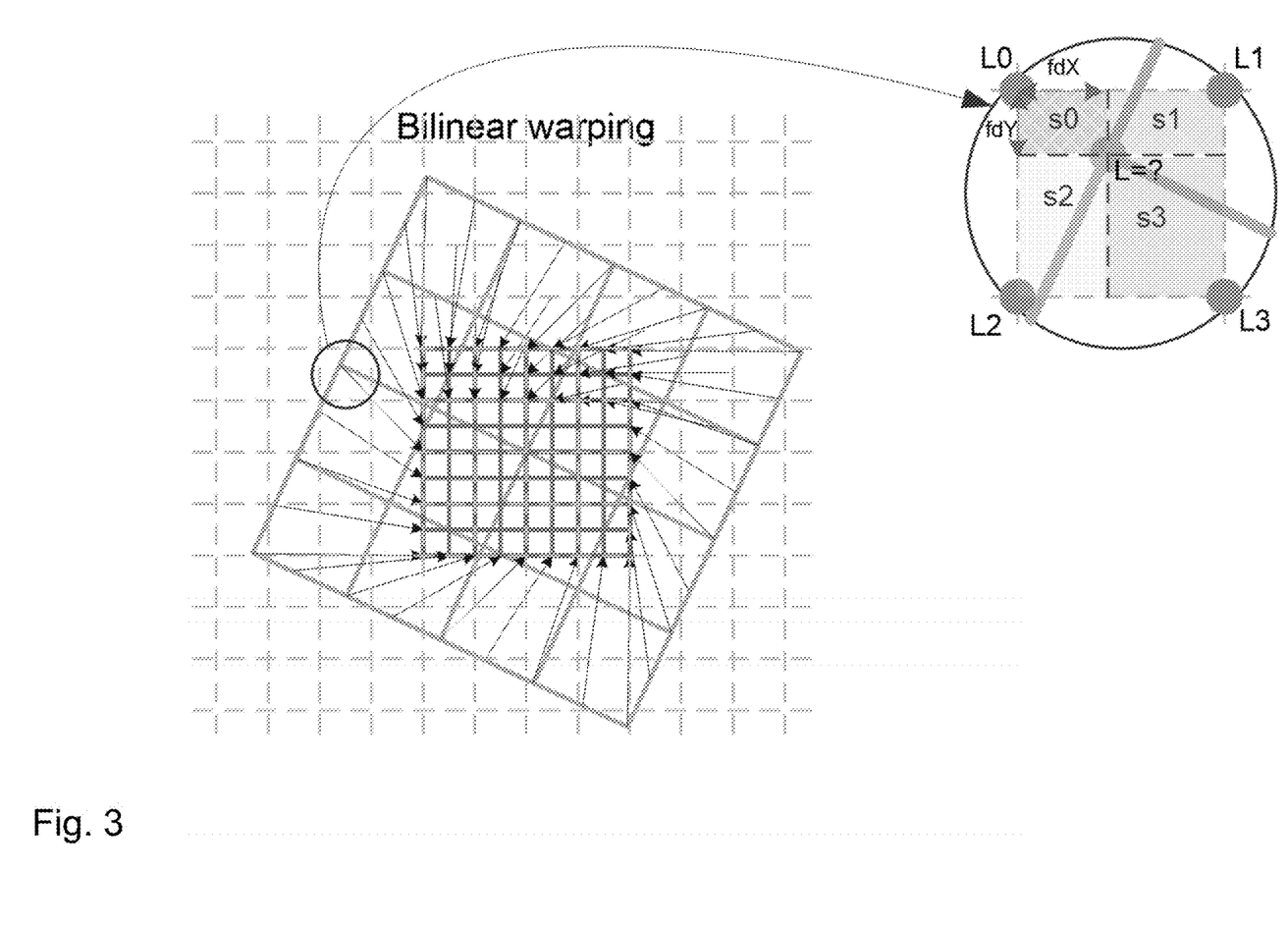
FIG. 3 shows a schematic diagram illustrating an aspect of an interpolation process implemented in an inter prediction apparatus according to an embodiment.

FIG. 2 shows a decoding apparatus 200 according to an embodiment comprising an inter prediction apparatus 244 according to an embodiment. The decoding apparatus 200 is configured to decode a block of a frame of an encoded video signal. In the embodiment shown in FIG. 2 the decoding apparatus 200 is implemented as a hybrid decoder. An entropy decoding unit 204 performs entropy decoding of the encoded picture data, which generally can comprise prediction errors (i.e. residual blocks), motion data and other side information, which are needed, in particular, for the inter prediction apparatus 244 and an intra prediction unit 254 as well as other components of the decoding apparatus 200. In the embodiment shown in FIG. 2, the inter prediction apparatus 244 or the intra prediction unit 254 of the decoding apparatus 200 shown in FIG. 3 are selected by a mode selection unit 260 and function in the same way as the inter prediction apparatus 144 and the intra prediction unit 154 of the encoding apparatus 100 shown in FIG. 1, so that identical predictions can be generated by the encoding apparatus 100 and the decoding apparatus 200. A reconstruction unit 214 of the decoding apparatus 200 is configured to reconstruct the block on the basis of the filtered predicted block and the residual block provided by the inverse quantization unit 210 and the inverse transformation unit 212. As in the case of the encoding apparatus 100, the reconstructed block can be provided to a line buffer 216 used for intra prediction and the filtered block/frame can be provided to a decoded picture buffer 230 by the in-loop filter 220 for future inter predictions.

As already described above, the apparatus 144, 244 is configured to perform an inter prediction of a sample value of a current full-integer pixel of a plurality of pixels of a current block of a current frame of a video signal. The apparatus 144, 244 comprises a processing unit, which can be implemented in software and/or hardware.

The processing unit of the apparatus 144, 244 is configured to determine a motion vector of the current full-integer pixel. In an embodiment, the processing unit of the apparatus 144, 244 is configured to determine the motion vector of the current full-integer pixel on the basis of the current frame and a reference frame of the video signal by determining the position of the pixel in the reference frame corresponding to the current full-integer pixel in the current frame. In an embodiment, the processing unit of the apparatus 144, 244 is configured to determine the motion vector of the current full-integer pixel on the basis of an adopted motion compensation model. For instance, in the case of a translational or affine motion compensation model the motion vector of the current full-integer pixel can be determined using one or more motion vectors of pixels of the same block the current full-integer pixel belongs to. As used herein, "motion compensation model" is also referred to as motion transformational model, motion model description and the like.

The processing unit of the apparatus 144, 244 is further configured to determine for the current full-integer pixel the corresponding sub-integer pixel in the reference frame on the basis of the motion vector of the current full-integer pixel.

The processing unit of the apparatus 144, 244 is further configured to generate on the basis of a predefined set of filter support pixels in the current frame a set of corresponding filter support pixels in the reference frame. The predefined set of filter support pixels in the current frame comprises one or more neighboring full-integer pixels and/or sub-integer pixels of the current full-integer pixel.

In an embodiment, the predefined set of filter support pixels in the current frame comprises one or more vertically and/or horizontally neighboring half-integer pixels of the current full-integer pixel in the current frame. For instance, in an embodiment the predefined set of filter support pixels in the current frame comprises the neighboring half-integer pixels above, to the left of, below and to the right of the current full-integer pixel.

In an embodiment, the predefined set of filter support pixels in the current frame comprises one or more vertically and/or horizontally neighboring full-integer pixels of the current full-integer pixel in the current frame. For instance, in an embodiment the predefined set of filter support pixels in the current frame comprises the neighboring full-integer pixels above, to the left of, below and to the right of the current full-integer pixel. In an embodiment, the predefined set of filter support pixels in the current frame can comprise the neighboring half-integer and full-integer pixels above, to the left of, below and to the right of the current full-integer pixel in the current frame.

The processing unit of the apparatus 144, 244 is further configured to determine a respective sample value, in particular a luminance value of the corresponding sub-integer pixel of the current full-integer pixel and the corresponding filter support pixels in the reference frame.

In an embodiment, the processing unit of the apparatus 144, 244 is configured to determine the respective sample values of the corresponding sub-integer pixel of the current full-integer pixel in the reference frame and of the corresponding filter support pixels in the reference frame on the basis of a bilinear interpolation of the respective neighboring full-integer pixels in the reference frame. FIG. 3 illustrates an example of using bilinear interpolation for determining the sample value of the corresponding sub-integer pixel of the current full-integer pixel in the reference frame. In FIG. 3, a reference block in the reference frame is enlarged and rotated relative to a current block comprising an exemplary current pixel of the current frame. Moreover, FIG. 3 illustrated the increased resolution used for the filter support pixels.

As can be taken from the enlarged view in FIG. 3, in an embodiment the sample value L of the corresponding sub-integer pixel of the current full-integer pixel in the reference frame can be determined by the processing unit as follows. The corresponding sub-integer pixel of the current full-integer pixel has the fractional position (fdX, fdY) in a corresponding cell of the sample grid of the reference frame. L0, L1, L2, L3 are the known sample values of the neighboring full-integer pixels in the reference frame (i.e. the full-integer pixels located at the corners of the corresponding cell of the sample grid of the reference frame the corresponding sub-integer pixel of the current full-integer pixel is located in). On the basis of the fractional position (fdX, fdY) the respective areas of the rectangles corresponding to s0, s1, s2, s3 can be calculated as follows: s0=fdX*fdY, s1=(1−fdX)*fdY, s2=fdX*(1−fdY), s3=(1−fdX)*(1−fdY). Bilinear interpolation can be expressed using a 2-tap filter having the following horizontal coefficients (1−fdX, fdX) and the following vertical coefficients (1−fdY, fdY). On the basis of these weighting factors the sample value L of the corresponding sub-integer pixel of the current full-integer pixel in the reference frame can be determined on the basis of the following equation:

L=L0*s3+L1*s2+L2*s1+L3*s0. As already mentioned above, the same bilinear interpolation can be used for determining the sample values for the corresponding filter support pixels in the reference frame.

The processing unit of the apparatus 144, 244 is further configured to determine an inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

In an embodiment, the spatial high-pass filter is a 5-tap filter. In an embodiment, the 5-tap filter is a symmetric filter, i.e. a filter where the first and the fifth filter coefficients are identical and the second and the fourth filter coefficients are identical. In an embodiment, the first and the fifth filter coefficients are negative, while the other filter coefficients of the 5-tap filter are positive. In an embodiment, the spatial high-pass filter can be applied separately in the vertical and the horizontal direction.

In an embodiment, the predefined set of filter support pixels in the current frame comprises five neighboring full-integer pixels and half-integer pixels of the current full-integer pixel and the 5-tap filter has the following filter coefficients (−6, 9, 26, 9, −6) within a given numerical precision, which can be normalized by the factor ⅓₂.

In a further embodiment, the predefined set of filter support pixels in the current frame comprises five neighboring full-integer pixels and half-integer pixels of the current full-integer pixel and the 5-tap filter has the following filter coefficients (−1, 0, 10, 0, −1) within a given numerical precision, which can be normalized by the factor ⅛. As will be appreciated, in an embodiment without the intermediate half-integer support pixels, this filter becomes a 3-tap filter with three full-integer support pixels and with the coefficients (−1, 10, −1).

In an embodiment, the processing unit of the apparatus 144, 244 is configured to determine the inter predicted sample value of the current pixel in the current frame on the basis of a two-dimensional separable convolution process on the basis of the filter support pixels. For instance, for the case of a 5-tap filter the processing unit of the apparatus 144, 244 is configured to apply the 5-tap filter to each horizontal and vertical line defined by the five horizontally and vertically neighbouring half-integer and full-integer pixels of the current pixel.

Figure 4:
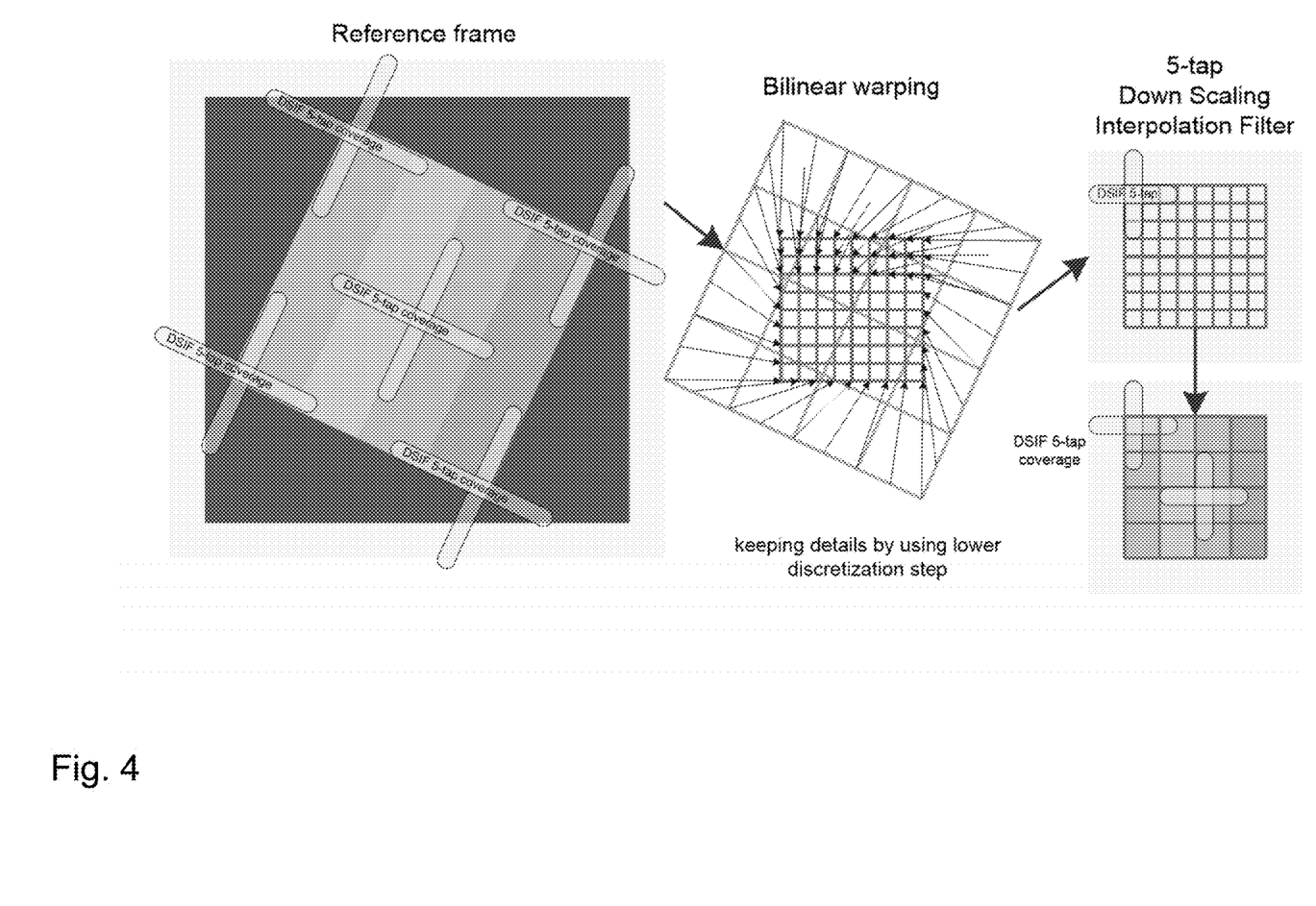
FIG. 4 shows a schematic diagram illustrating different aspects of an interpolation process implemented in an inter prediction apparatus according to an embodiment.

FIG. 4 illustrates different stages of the processing unit performed by the processing unit of the apparatus 144, 244 using a 5-tap filter in the vertical and the horizontal direction for the example shown in FIG. 3. As in the example shown in FIG. 3, the reference block is enlarged and rotated (corresponding to an affine transformation) relative to the current block, the 5-tap filters, which are vertical and horizontal in the current frame, are rotated in the reference frame.

In the following further embodiments of the inter prediction apparatus 144, 244, the encoding apparatus 100 and the decoding apparatus 200 will be described. In this context it will be understood that embodiments of the inter prediction apparatus 144, 244 relate to embodiments of the inter prediction apparatus 133 as implemented in the encoding apparatus 100 as well as embodiments of the inter prediction apparatus 244 as implemented in the decoding apparatus 200.

In an embodiment, the processing unit of the apparatus 144, 244 is further configured to determine a respective motion vector of each of the sub-integer pixels of the filter support pixels in the current frame on the basis of the motion vector of the current full-integer pixel and one or more motion vectors of neighboring full-integer pixels of the current full-integer pixel. To this end, in an embodiment, the processing unit of the apparatus 144, 244 is configured to determine a mean vector of the motion vector of the current full-integer pixel and one or more motion vectors of neighboring full-integer pixels of the current full-integer pixel. For instance, for determining the motion vector of the half-integer pixel above the current full-integer pixel in the current frame the processing unit of the apparatus 144, 244 can compute the average, i.e. mean of the motion vector of the current full-integer pixel and the motion vector of the neighboring full-integer pixel above the current full-integer pixel.

Similar to the determination of the motion vector of the current pixel the processing unit of the apparatus 144, 244 can be configured to determine the one or more motion vectors of neighboring full-integer pixels of the current full-integer pixel on the basis of the current frame and the reference frame of the video signal and/or a motion compensation model.

In an embodiment, the processing unit of the apparatus 144, 244 is configured to determine the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame, in case the motion vector of the current full-integer pixel is determined on the basis of a non-translational motion compensation model, and to determine the inter predicted sample value of the current pixel in the current frame on the basis of a conventional scheme, such as the conventional scheme defined in H.264/AVC and H.265/HEVC, in case the motion vector of the current full-integer pixel is determined on the basis of a translational motion compensation model. In an embodiment, the non-translational motion compensation model is an affine, warping and/or panoramic motion compensation model.

Figure 7:
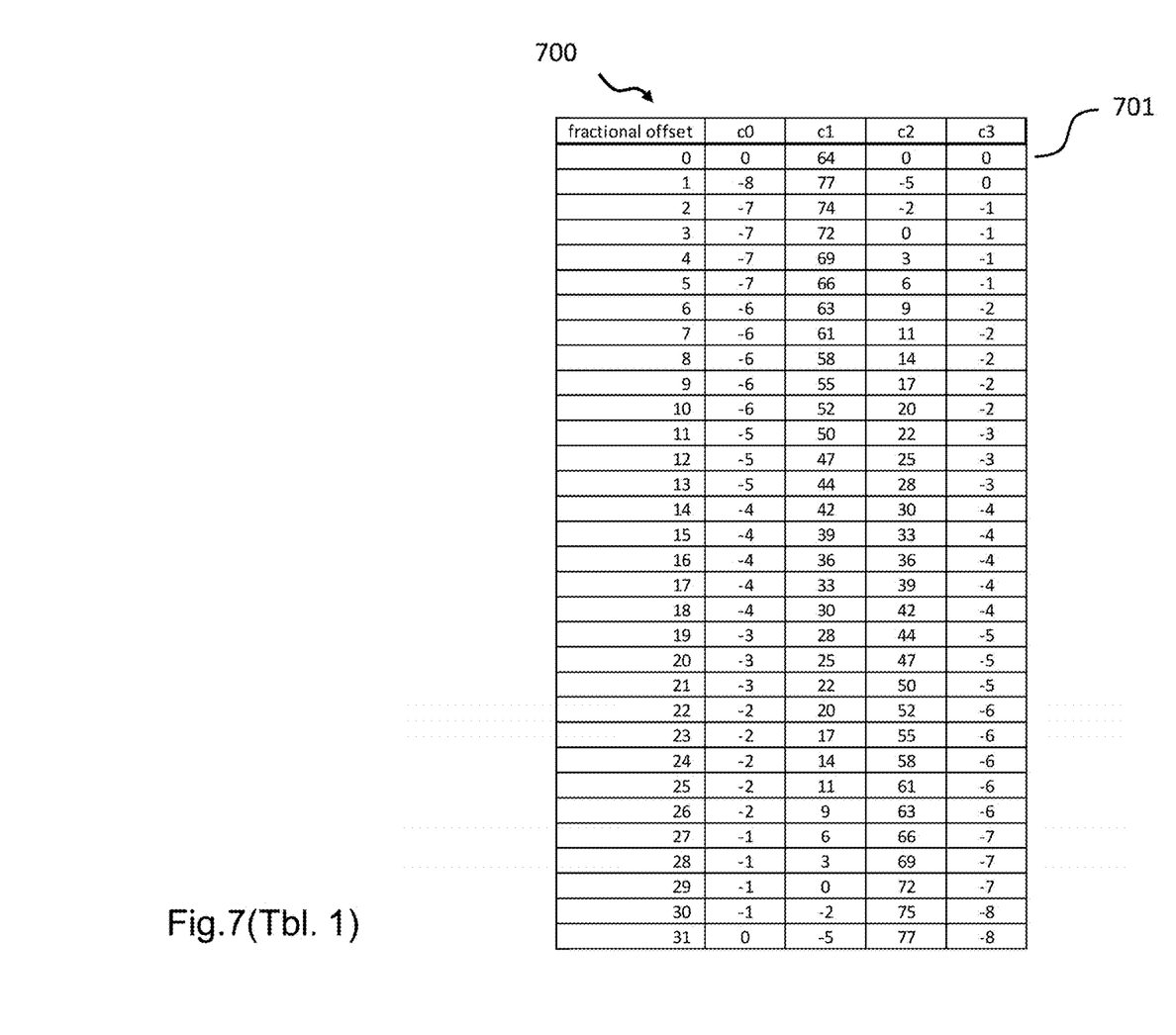
FIG. 7 shows Table 1.

In an another embodiment for translational motion compensation model the processing unit of the apparatus 144, 244 is configured to construct the set of separable 4-tap filters by convolving the proposed filters (i.e. the bilinear filter and the subsequent high-pass filter); for example, as follows: $[f, 1-f]*[c0,c1,c2]=[(1-f)*(c0), f*(c0)-(1-f)*c1, f*(c1)+(1-f)*c2, f*(c2)]$, where f is a fractional offset of the motion vector in the horizontal or vertical direction, and $[c0,c1,c2]$ are coefficients of the high-pass filter. The fractional position in this case may be discrete with a certain precision to obtain the finite table size. The final values of the coefficients may be multiplied by a norm factor and rounded so that the sum of coefficients for each offset equals the norm factor. For some specific scenarios, a filter with zero fractional offset may be equal to 1 (701) (no filtering for zero offset). For instance, having norm factor equal to 64 and fractional offset precision $\frac{1}{32}$, the set of filter coefficients (700) may be the one shown in Table 1. This technique may be used, for example, for filtering chroma components. The technique may also be used for filtering of small blocks in order to keep worst case complexity and/or memory bandwidth low.

In any embodiments, the intermediate rounding or clipping at any step of implementation could be applied in order to keep the fixed number of bits as input range for computational operations. For instance, after any separable step of filtering (like horizontal filtering) intermediate values could be normalized and rounded to 16 bit of precision for using in the following multiplication by filter coefficient of the next step (like vertical filtering).

Figure 5:
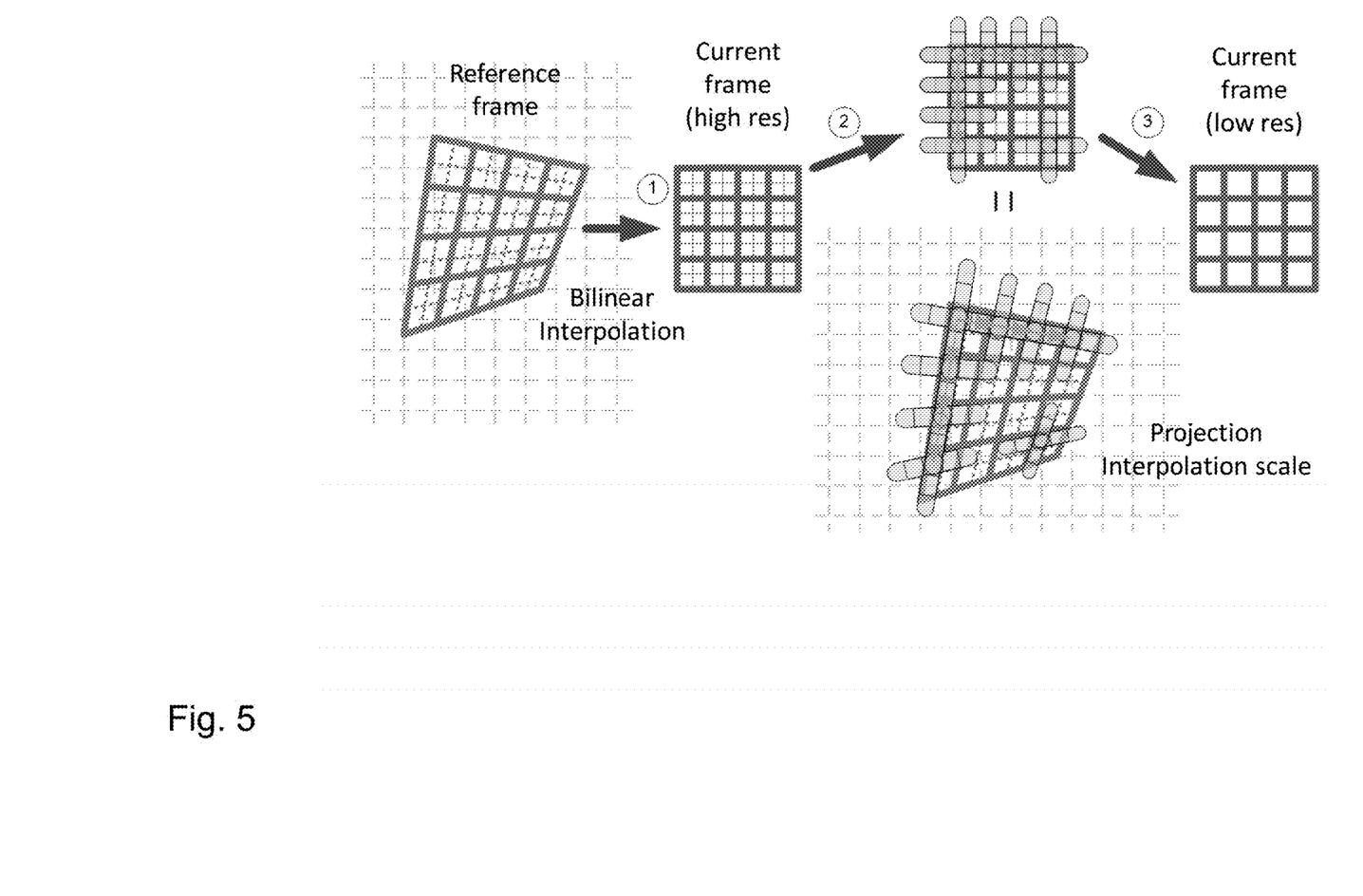
FIG. 5 shows a schematic diagram illustrating different aspects of an interpolation process implemented in an inter prediction apparatus according to an embodiment.

FIG. 5 summarizes several aspects of embodiments of the disclosure described above.

Figure 6:
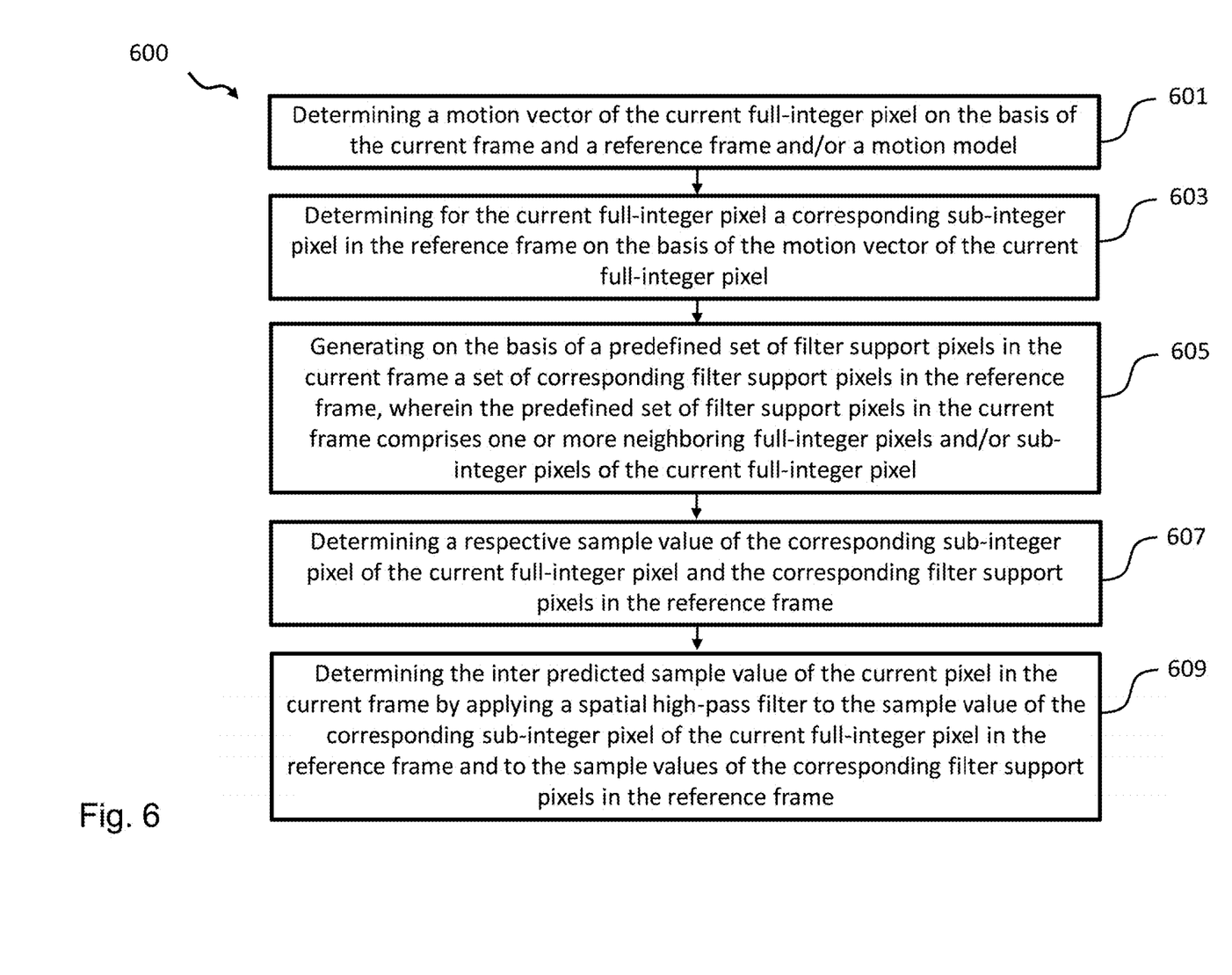
FIG. 6 shows a flow diagram illustrating steps of an inter prediction method according to an embodiment.

FIG. 6 shows a flow diagram illustrating steps of a corresponding inter prediction method 600 according to an embodiment. The method 600 comprises the following steps: determining 601 a motion vector of the current full-integer pixel on the basis of the current frame and a reference frame of the video signal and/or on the basis of a motion compensation model; determining 603 for the current full-integer pixel a corresponding sub-integer pixel in the reference frame on the basis of the motion vector of the current full-integer pixel; generating 605 on the basis of a predefined set of filter support pixels in the current frame a set of corresponding filter support pixels in the reference frame, wherein the predefined set of filter support pixels in the current frame comprises one or more neighboring full-integer pixels and/or sub-integer pixels of the current full-integer pixel; determining 607 a respective sample value of the corresponding sub-integer pixel of the current full-integer pixel and the corresponding filter support pixels in the reference frame; and determining 609 the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the embodiments beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the embodiments may be practiced otherwise than as specifically described herein.

What is claimed is:

1. An apparatus for inter prediction of a sample value of a current full-integer pixel of a plurality of pixels of a current block of a current frame of a video signal, wherein the apparatus comprises a processor configured to:
   determine a motion vector of the current full-integer pixel on the basis of:
   (a) the current frame and a reference frame of the video signal,
   (b) the current frame and a motion compensation model, or
   (c) the current frame, the reference frame of the video signal and the motion compensation model;

determine for the current full-integer pixel a corresponding sub-integer pixel in the reference frame on the basis of the motion vector of the current full-integer pixel;

generate on the basis of a predefined set of filter support pixels in the current frame a set of corresponding filter support pixels in the reference frame, wherein the predefined set of filter support pixels in the current frame comprises at least one of neighboring full-integer pixels or sub-integer pixels of the current full-integer pixel;

determine a respective sample value of the corresponding sub-integer pixel of the current full-integer pixel and the corresponding filter support pixels in the reference frame; and in response to the motion vector of the current full-integer pixel being determined on the basis of a non-translational motion compensation model, determine the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

2. The apparatus of claim 1, wherein the predefined set of filter support pixels in the current frame comprises at least one of vertically or horizontally neighboring half-integer pixels of the current full-integer pixel in the current frame.

3. The apparatus of claim 1, wherein the predefined set of filter support pixels in the current frame comprises at least one of vertically or horizontally neighboring full-integer pixels of the current full-integer pixel in the current frame.

4. The apparatus of claim 1, wherein the spatial high-pass filter is a 5-tap or a 3-tap filter.

5. The apparatus of claim 4, wherein the predefined set of filter support pixels in the current frame comprises one or more neighboring full-integer pixels and half-integer pixels of the current full-integer pixel and wherein the 5-tap filter has the following filter coefficients (−6, 9, 26, 9, −6).

6. The apparatus of claim 4, wherein the predefined set of filter support pixels in the current frame comprises at least one of neighboring full-integer pixels or half-integer pixels of the current full-integer pixel and wherein the 5-tap filter has the filter coefficients (−1, 0, 10, 0, −1) or the 3-tap filter has the filter coefficients (−1, 10, −1).

7. The apparatus of claim 1, wherein the processor is configured to determine the respective sample values of the corresponding sub-integer pixel of the current full-integer pixel in the reference frame and of the corresponding filter support pixels in the reference frame on the basis of a bilinear interpolation of the respective neighboring full-integer pixels in the reference frame.

8. The apparatus of claim 1, wherein the processor is further configured to determine a respective motion vector of each of the sub-integer pixels of the filter support pixels in the current frame on the basis of the motion vector of the current full-integer pixel and one or more motion vectors of neighboring full-integer pixels of the current full-integer pixel.

9. The apparatus of claim 8, wherein the processor is configured to determine a respective motion vector of each of the sub-integer pixels of the filter support pixels in the current frame by determining a mean vector of the motion vector of the current full-integer pixel and one or more motion vectors of neighboring full-integer pixels of the current full-integer pixel.

10. The apparatus of claim 1, wherein the non-translational motion compensation model includes an affine motion compensation model, a warping motion compensation model or a panoramic motion compensation model.

11. The apparatus of claim 1, wherein the processor is configured to construct a set of separable 4-tap filters constructed as a convolution of a bilinear filter and a following high-pass filter.

12. The apparatus of claim 1, wherein the processor is configured to apply an intermediate rounding operation in the filtering process.

13. The apparatus of claim 1, wherein the apparatus is used for an encoding apparatus for encoding a current frame of a video signal, or the apparatus is used for decoding apparatus for decoding a current reconstructed frame of a compressed video signal.

14. A method for inter prediction of a sample value of a current full-integer pixel of a plurality of pixels of a current block of a current frame of a video signal, wherein the method comprises:

determining a motion vector of the current full-integer pixel on the basis of:
(a) the current frame and a reference frame of the video signal,
(b) the current frame and a motion compensation model, or
(c) the current frame, the reference frame of the video signal and the motion compensation model;

determining for the current full-integer pixel a corresponding sub-integer pixel in the reference frame on the basis of the motion vector of the current full-integer pixel;

generating on the basis of a predefined set of filter support pixels in the current frame a set of corresponding filter support pixels in the reference frame, wherein the predefined set of filter support pixels in the current frame comprises at least one of neighboring full-integer or sub-integer pixels of the current full-integer pixel;

determining a respective sample value of the corresponding sub-integer pixel of the current full-integer pixel and the corresponding filter support pixels in the reference frame; and in response to the motion vector of the current full-integer pixel being determined on the basis of a non-translational motion compensation model, determining the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

15. The method of claim 14, wherein the method is implemented in an encoding apparatus for encoding a current frame of a video signal, or the method is implemented in a decoding apparatus for decoding a current reconstructed frame of a compressed video signal.

16. A non-transitory computer-readable medium, having computer-executable instructions stored thereon, the computer-executable instructions, when executed by one or more processors, cause the one or more processors to implement a method for inter prediction of a sample value of a current full-integer pixel of a plurality of pixels of a current block of a current frame of a video signal, wherein the method comprises:

determining a motion vector of the current full-integer pixel on the basis of:
(a) the current frame and a reference frame of the video signal, (b) the current frame and a motion compensation model, or
(c) the current frame, the reference frame of the video signal and the motion compensation model;

determining for the current full-integer pixel a corresponding sub-integer pixel in the reference frame on the basis of the motion vector of the current full-integer pixel;

generating on the basis of a predefined set of filter support pixels in the current frame a set of corresponding filter support pixels in the reference frame, wherein the predefined set of filter support pixels in the current frame comprises at least one of neighboring full-integer or sub-integer pixels of the current full-integer pixel;

determining a respective sample value of the corresponding sub-integer pixel of the current full-integer pixel and the corresponding filter support pixels in the reference frame; and in response to the motion vector of the current full-integer pixel being determined on the basis of a non-translational motion compensation model, determining the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

\* \* \* \* \*